United States Patent
Miyazawa et al.

(10) Patent No.: US 8,357,228 B2
(45) Date of Patent: Jan. 22, 2013

(54) GAS PURIFICATION METHOD

(75) Inventors: Yuzuru Miyazawa, Tokyo (JP);
Yoshihiko Kobayashi, Kawasaki (JP);
Kenji Haraya, Tsukuba (JP); Miki Yoshimune, Tsukuba (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 236 days.

(21) Appl. No.: 12/682,329

(22) PCT Filed: Oct. 9, 2008

(86) PCT No.: PCT/JP2008/068398
§ 371 (c)(1),
(2), (4) Date: Apr. 9, 2010

(87) PCT Pub. No.: WO2009/048114
PCT Pub. Date: Apr. 16, 2009

(65) Prior Publication Data
US 2010/0206164 A1  Aug. 19, 2010

(30) Foreign Application Priority Data

Oct. 12, 2007 (JP) .............................. P2007-266495
Sep. 17, 2008 (JP) .............................. P2008-238357

(51) Int. Cl.
*B01D 53/22* (2006.01)

(52) U.S. Cl. ............. 95/48; 95/45; 95/55; 95/903; 96/4; 96/10; 502/4; 502/416

(58) Field of Classification Search ................. 95/45, 47, 95/48, 50, 52, 53, 54, 55, 903; 96/4, 9, 11, 96/10; 502/4, 416
See application file for complete search history.

(56) References Cited

U.S. PATENT DOCUMENTS

| | | | |
|---|---|---|---|
| 5,637,544 A * | 6/1997 | Shadman | 502/4 |
| 6,395,066 B1 | 5/2002 | Tanihara et al. | |
| 6,921,428 B2 * | 7/2005 | Yamamoto et al. | 95/45 |
| 2002/0189445 A1 | 12/2002 | Miller et al. | |

FOREIGN PATENT DOCUMENTS

| | | |
|---|---|---|
| EP | 1 034 836 A1 | 9/2000 |
| JP | 7-171330 | 7/1995 |
| JP | A-08-511196 | 11/1996 |
| JP | 2615265 | 3/1997 |
| JP | 2688751 | 12/1997 |

(Continued)

OTHER PUBLICATIONS

Extended European Search Report in EP 08 83 7162 dated Mar. 1, 2011.

(Continued)

*Primary Examiner* — Jason M Greene
(74) *Attorney, Agent, or Firm* — Nixon & Vanderhye P.C.

(57) ABSTRACT

A gas purification method of the present invention uses a carbon membrane having a molecular sieving action to purify at least one selected from the group consisting of a hydride gas, a hydrogen halide gas, and a halogen gas, each gas containing an impurity at 10 ppm or less. The present invention can be used for a recovery unit that recoveries a used gas to reuse it as an ultrapure semiconductor material gas, and a unit or equipment that produces or charges an ultrapure semiconductor material gas.

2 Claims, 2 Drawing Sheets

FOREIGN PATENT DOCUMENTS

| | | |
|---|---|---|
| JP | 10-297910 | 11/1998 |
| JP | 10-298118 | 11/1998 |
| JP | 11-118752 | 4/1999 |
| JP | 2002-308608 | 10/2002 |
| JP | 2003-037104 | 2/2003 |
| JP | 3433226 | 5/2003 |
| JP | 2004-339187 | 12/2004 |
| JP | 2005-060225 | 3/2005 |
| JP | 2005-154203 | 6/2005 |
| WO | WO 91/04223 | 4/1991 |
| WO | WO-94/22561 A1 | 10/1994 |
| WO | WO 95/03885 | 2/1995 |
| WO | WO 99/36159 | 7/1999 |

OTHER PUBLICATIONS

International Search Report for PCT/JP2008/068398, mailed Dec. 9, 2008.
Korean Office Action (with English translation) in KR 10-2010-7007714 dated Sep. 19, 2011.
Japanese Office Action (with English translation) in JP2009-537029 dated Oct. 30, 2012.

* cited by examiner

GAS PURIFICATION METHOD

This application is the U.S. national phase of International Application No. PCT/JP2008/068398 filed 9 Oct. 2008 which designated the U.S. and claims priority to Japanese Patent Application Nos. 2007-266495 filed 12 Oct. 2007 and 2008-238357 filed 17 Sep. 2008, the entire contents of each of which are hereby incorporated by reference.

TECHNICAL FIELD

The present invention relates to a gas purification method, and particularly to a gas purification method which uses a carbon membrane having a molecular sieving action to purify a gas such as silane or phosphine.

BACKGROUND ART

Currently, as a gas used as a semiconductor material, a gas in which a volume concentration of impurities is at a ppt-ppb level is preferred to a gas in which a volume concentration of impurities is at a ppb-ppm level.

Examples of a gas used as a semiconductor material include a hydride gas such as ammonia, silane, or phosphine; a halide gas such as hydrogen fluoride, hydrogen chloride, or hydrogen bromide; and a halogen gas such as fluorine, chlorine, or bromine. These gases have high reactivity and strong corrosivity.

An example of a gas purification technique is a purification method using a gas separation membrane. Examples of the purification using a gas separation membrane include the purification of hydrogen, helium, or argon, in which a volume concentration of impurities is at a % level, using a polyaramid membrane, etc. (see patent document 1); the purification of phosphine, in which a volume concentration of impurities is at a % level, using a polyaramid membrane, etc. (see patent document 2); the purification of carbonyl fluoride, in which a volume concentration of impurities is at a % level, using a polyimide membrane (see patent document 3); the recovery of ammonia using a pervaporation membrane (see patent document 4); the purification of tetrafluoroethylene, in which a volume concentration of impurities is at a % level, using a polyimide membrane, etc. (see patent document 5); the purification of silane, in which a volume concentration of impurities is at a % level, using a membrane made by sulfonated polysulfone (see patent document 6); and the purification of chlorine using an inorganic porous membrane of silica and alumina, etc. (see patent document 7).

[Patent Document 1]
Japanese Unexamined Patent Application, First Publication No. Hei 7-171330
[Patent Document 2]
Japanese Unexamined Patent Application, First Publication No. 2002-308608
[Patent Document 3]
Japanese Unexamined Patent Application, First Publication No. 2005-154203
[Patent Document 4]
Japanese Unexamined Patent Application, First Publication No. 2005-60225
[Patent Document 5]
Japanese Unexamined Patent Application, First Publication No. 2003-37104
[Patent Document 6]
Japanese Patent Publication No. 2615265
[Patent Document 7]
Japanese Patent Publication No. 3433226

DISCLOSURE OF INVENTION

Problems to be Solved by the Invention

However, in the inventions exemplified in the aforementioned respective patent documents, the volume concentrations of impurities in the gases to be purified are at a % level, and there is no disclosure regarding the possibility of purification in the case where a volume concentration of impurities is at a ppm level. Also, a volume concentration of impurities has been required to be at a ppb-ppm level in a conventional gas used as a semiconductor material, but currently, is required to be at a ppt-ppm level.

An object of the present invention is to provide a gas purification method that purifies a highly pure semiconductor material gas having high reactivity and strong corrosivity to be an ultrapure gas with a much higher purity.

Means to Solve the Problems

The present invention is a gas purification method which uses a carbon membrane having a molecular sieving action to purify at least one selected from the group consisting of a hydride gas, a hydrogen halide gas, and a halogen gas, each gas containing an impurity at 10 ppm or less.

In the present invention, it is preferable that the carbon membrane be in a hollow fiber shape or a pipe shape.

Effect of the Invention

According to the present invention, a highly pure gas such as a hydride gas, a hydrogen hydride gas, or a halogen gas, which has high reactivity and strong corrosivity and is used as a semiconductor material, is purified using a carbon membrane having a molecular sieving action, and therefore, impurities of ppm order therein can be removed, and an ultrapure gas can be obtained.

Moreover, a carbon membrane has better chemical resistance than other gas separation membranes having a molecular sieving action (such as a zeolite membrane or a silica membrane), and therefore is suitable for the purification of a semiconductor material gas with a strong corrosivity. In addition, a carbon membrane is excellent in separation performance, and therefore, it is possible to efficiently purify a gas containing impurities at 10 ppm or less. In addition, when the carbon membrane is molded in a hollow fiber shape, a membrane module can be compactly designed as compared with a flat film shape or a spiral shape.

| DESCRIPTION OF THE REFERENCE SYMBOLS | |
|---|---|
| 1 | represents a carbon membrane module, |
| 2 | represents a carbon membrane unit, |
| 2a | represents a hollow fiber-shaped carbon membrane, |
| 3 | represents a gas supply port, |
| 4 | represents a permeated gas discharge port, |

-continued

DESCRIPTION OF THE REFERENCE SYMBOLS

| | |
|---|---|
| 5 | represents an unpermeated gas discharge port, |
| 6 | represents a hermetic container, |
| 7 | represents a resin wall, |
| 8 | represents a sweep supply port, |
| 9 | represents a first space, |
| 10 | represents a second space, |
| 11 | represents a first space, |
| 12 | represents a second space, and |
| 13 | represents a third space. |

BEST MODE FOR CARRYING OUT THE INVENTION

Hereinafter, an embodiment for carrying out the present invention is described with reference to FIG. 1 to FIG. 4.

Figure 1:
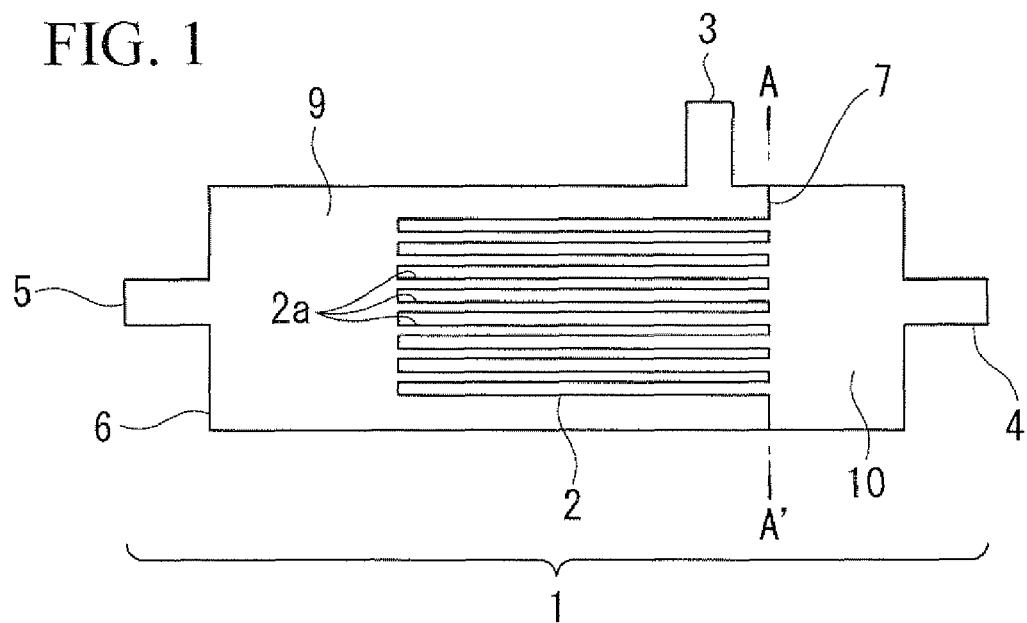
FIG. 1 is a schematic cross-sectional view illustrating an example of a carbon membrane module in the present invention.
Figure 2:
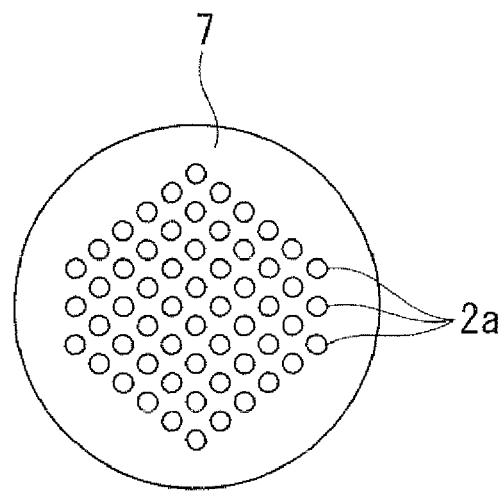
FIG. 2 is the A-A' cross-sectional view in the carbon membrane module illustrated by FIG. 1.

FIG. 1 and FIG. 2 shows an embodiment of the carbon membrane module 1 used in a gas purification method of the present invention.

In FIG. 1, the reference symbol 1 represents the carbon membrane module. This carbon membrane module 1 is mainly comprised of the hermetic container 6 and the carbon membrane unit 2 provided within the hermetic container 6.

The hermetic container 6 is formed in a hollow cylinder shape, in which the permeated gas discharge port 4 is provided on one end face, and the unpermeated gas discharge port 5 is provided on the other end face. Moreover, the gas supply port 3 is provided on the peripheral surface of the hermetic container 6.

The carbon membrane unit 2 is comprised of a plurality of the hollow fiber-shaped carbon membranes 2a . . . and the resin wall 7 that bundle these hollow fiber-shaped carbon membranes 2a . . . to be fixed. The resin wall 7 is hermetically fixed to the inner wall of the heinietic container 6 by using an adhesive, etc. FIG. 2 is the A-A' cross-sectional view in the carbon membrane module illustrated by FIG. 1, and illustrates the surface structure of the resin wall 7 within the hermetic container 6. The opening section of the hollow fiber-shaped carbon membranes 2a . . . is formed in the resin wall 7.

The space within the hermetic container 6 is divided by the resin wall 7 into the first space 9 and the second space 10. The first space 9 is the space having a bundle of the hollow fiber-shaped carbon membranes 2a . . . , and the second space 10 is the space which is opposite to the space having a bundle of the hollow fiber-shaped carbon membranes 2a . . . when the resin wall 7 is considered as a boundary plane.

The hollow fiber-shaped carbon membranes 2a . . . have one end being fixed to the resin wall 7 and opened, and the other end being closed. Through the section at which the hollow fiber-shaped carbon membranes 2a . . . are fixed to the resin wall 7, the opening section of the hollow fiber-shaped carbon membranes 2a . . . leads into the second space 10. Therefore, the first space 9 and the second space 10 are communicated with each other through the carbon membrane unit 2.

The hollow fiber-shaped carbon membranes 2a . . . are produced by preparing an organic polymer membrane followed by sintering. For example, an organic polymer such as polyimide is dissolved in any solvent to prepare the membrane-forming raw liquid. Meanwhile, the other solvent is prepared, which can mix the solvent of the membrane-forming raw liquid but does not dissolve polyimide. Subsequently, the membrane-forming raw liquid and the other solvent are simultaneously ejected into a congealed liquid from the ring-shaped opening of the periphery region and the circular opening of the central region of the hollow fiber spinning nozzle with a double pipe structure, respectively, and a membrane is molded in a hollow fiber shape to thereby produce an organic polymer membrane. Next, the obtained organic polymer membrane is cured and then carbonized to obtain a carbon membrane.

The carbon membrane is not only used by itself but also in an appropriate configuration selected from a porous support and a gas separation membrane other than a carbon membrane, etc, each being coated with the carbon membrane. Examples of a porous support include a metallic filter and a filter of a ceramic material such as alumina, silica, magnesia, or zeolite. The coating of a support realizes the advantageous effects such as enhancement of mechanical strength and simplification of a carbon membrane production.

Herein, examples of the organic polymer which is a raw material of the carbon membrane include polyimide (aromatic polyimide), polyphenylene oxide (PPO), polyamide (aromatic polyamide), polypropylene, polyfurfuryl alcohol, polyvinylidene chloride (PVDC), a phenolic resin, cellulose, lignin, polyetherimide, and cellulose acetate.

Among the aforementioned raw materials of the carbon membrane, polyimide (aromatic polyimide), cellulose acetate, and polyphenylene oxide (PPO) are easy to mold the carbon membrane into a hollow fiber shape. What has particularly high separation performance is polyimide (aromatic polyimide) and polyphenylene oxide (PPO). In addition, polyphenylene oxide (PPO) is inexpensive as compared with polyimide (aromatic polyimide).

Next is a description of the gas purification method using the carbon membrane module I illustrated in FIG. 1. In the present invention, the molecular sieving action is an action by which a gas with a small molecular diameter and a gas with a large molecular diameter are separated according to a molecular diameter of a gas and a particle size of the separation membrane.

In general, a gas separation membrane has a separation factor of 10 to 1,000. Therefore, in order to perform the purification to obtain an ultrapure gas in which a volume concentration of impurities is at a ppt-ppb level, a highly pure gas in which a volume concentration of impurities is 10 ppm or less is supplied as a gas to be purified. However, the purification method itself is effective even when a gas in which a volume concentration of impurities is 10 ppm or more is supplied because a gas separation membrane generally has a separation factor of 10 to 1,000. In the present invention, there is no particular limitation to the lower limit of a volume concentration of impurities in a highly pure gas, but an example of a volume concentration of impurities in a gas which is a target of an ultrapurification is about 300 ppb.

A hydride gas, a hydrogen halide gas, and a halogen gas, which are purification targets, have a chance to be contaminated with impurities during the production, the exchange of a gas cylinder, and the self-decomposition. During the production and the exchange of a gas cylinder, nitrogen, oxygen, argon, or moisture may be contaminated in the aforementioned product gases. During the self-decomposition, hydrogen may be generated.

For example, when ammonia contains oxygen as an impurity, because ammonia has a molecular diameter of 0.26 nm and oxygen has a molecular diameter of 0.346 nm, the separation membrane should have a pore size between the molecular diameters of ammonia and oxygen. The oxygen-containing ammonia is continuously supplied through the gas supply port 3 of the carbon membrane module 1 and flows into the first space 9. The ammonia, which selectively permeates the hollow fiber-shaped carbon membranes 2a ... from the first space 9, flows through the inside of the hollow fiber-shaped carbon membranes 2a ... into the second space 10, and is discharged through the permeated gas discharge port 4. The oxygen, which does not permeate the hollow fiber-shaped carbon membranes 2a ... from the first space 9, is discharged through the unpermeated gas discharge port 5. Consequently, the oxygen concentration in the ammonia is reduced.

In addition, when chlorine contains moisture as an impurity, because chlorine has a molecular diameter of 0.32 nm and water has a molecular diameter of 0.265 nm, the separation membrane should have a pore size between the molecular diameters of chlorine and water. The moisture-containing chlorine is continuously supplied through the gas supply port 3 of the carbon membrane module 1 and flows into the first space 9. The water, which selectively permeates the hollow fiber-shaped carbon membranes 2a ... from the first space 9, flows through the inside of the hollow fiber-shaped carbon membranes 2a ... into the second space 10, and is discharged through the permeated gas discharge port 4. The chlorine, which did not permeate the hollow fiber-shaped carbon membranes 2a ... from the first space 9, is discharged through the unpermeated gas discharge port 5. Consequently, the moisture concentration in the chlorine is reduced.

Herein, the pore size of the membrane can be controlled by changing the sintering temperature during the carbonization.

During the purification, the carbon membrane module 1 is maintained at a constant temperature within −20° C. to 120° C. The higher the maintaining temperature is, the more the permeating flow rate can be increased. However, there is economical advantage in the use at room temperature.

The pressure of a gas supplied into the carbon membrane module 1 is usually kept at about 0.5 MPaG, but can be set at 1 MPaG or more when a support is used. The higher the pressure of a supplied gas is, the more the purification rate can be increased. In addition, when the permeated gas discharge port 4 is connected with a vacuum equipment, etc., the pressure at the side of the permeation is reduced, and the purification efficiency can be improved. In the present invention, the highly pure gas charged in a container such as a gas cylinder is supplied into the carbon membrane module 1 while adjusting the gas pressure at a predetermined pressure without using a pressurizer, etc. Therefore, a highly pure gas can be purified to be an ultrapure gas.

When a highly pure gas is purified to be an ultrapure gas, it is possible to use the plural carbon modules I connected in series. In addition, the ultrapure gas obtained by the purification in the carbon module 1 can be returned into the carbon membrane module 1 again, to make circulation.

Figure 3:
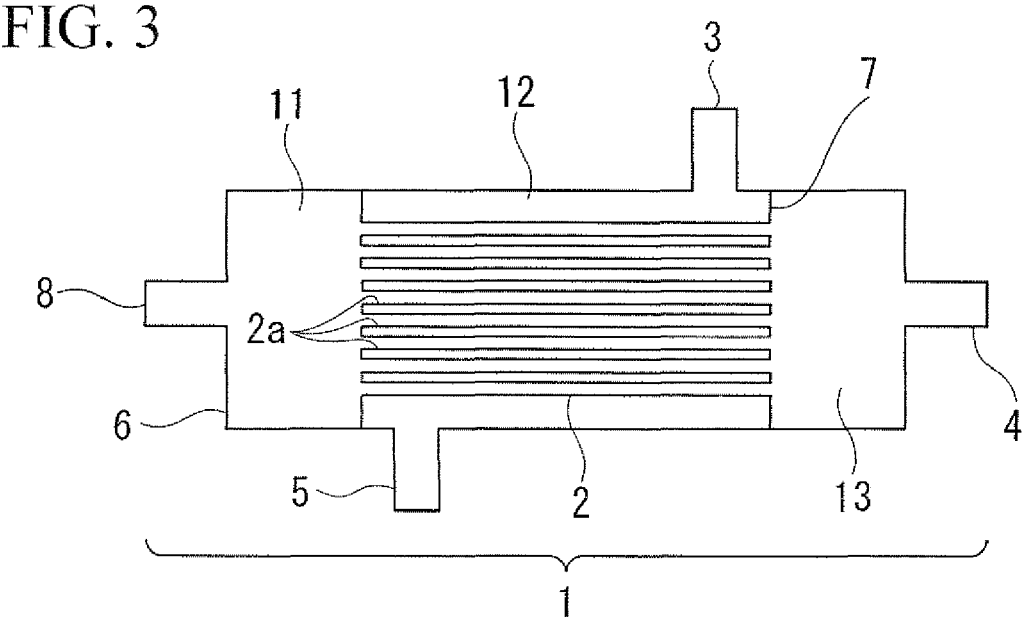
FIG. 3 is a schematic cross-sectional view illustrating an example of a carbon membrane module in the present invention in which a sweep gas supply port is provided on one end face.

FIG. 3 shows another embodiment of the carbon membrane module 1 used in a gas purification method of the present invention. The features of this carbon membrane module 1 and the carbon membrane module I illustrated by FIG. 1 are different in that the gas supply port 3 and the unpermeated gas discharge port 5 are provided on the peripheral surface of the hermetic container 6, and that the both ends of the carbon membrane unit 2 are fixed to the resin walls 7 and the space within the hermetic container 6 is divided by these resin walls 7 into three spaces of the first space 11, the second space 12, and the third space 13. When the sweep gas supply port 8 is provided at one end of the heiinetic container 6 and a gas, which is difficult to permeate the carbon membrane, is supplied as a sweep gas through the side of the permeation of the carbon membrane, i.e. the sweep gas supply port 8, the permeation of impurities can be enhanced. The sweep gas is another kind of gas that is not contained in a gas supplied through the gas supply port 3, such as Ar, He, or $N_2$, etc.

Figure 4:
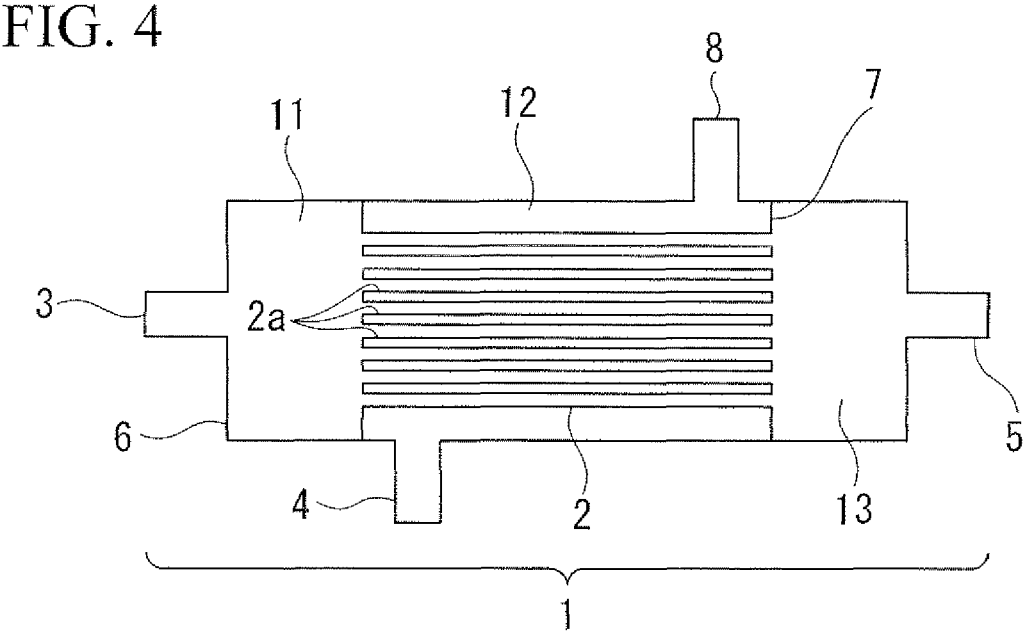
FIG. 4 is a schematic cross-sectional view illustrating an example of a carbon membrane module in the present invention in which a sweep gas supply port is provided on the peripheral surface.

FIG. 4 shows another embodiment of the carbon membrane module 1 used in a gas purification method of the present invention. The features of this carbon membrane module 1 and the carbon membrane module 1 illustrated by FIG. 3 are different in that the gas supply port 3 is not provided on the peripheral surface of the hermetic container 6 but the end face in a longitudinal direction of the hermetic container 6, and that the sweep gas supply port 8 is provided on the peripheral surface.

When an adhesive, etc. is used at the former section or the latter section of the gas separation membrane, it is possible to separate the gas components that are difficult to be separated by the gas separation membrane in the purification. For example, because the contact of the gas separation membrane with water is not generally preferred, molecular sieves, etc. are set at the former section of the gas separation membrane as a dehumidifying agent. Then, the purification target gas can be limited to the impurity-containing gas in which only water is removed, and the performance of the carbon membrane can be maintained for a long term.

In addition, the gas separation membrane can be used with a catalyst. An impure gas is converted by a catalyst, etc. into another impure gas which can be easily separated by the gas separation membrane, and then separated in the purification. For example, when the purification target gas contains carbon dioxide as an impure gas, a nickel catalyst that causes methanation is set at the former section of the gas separation membrane. Then, carbon dioxide that is an impure gas is converted into methane, and this methane is separated by the gas separation membrane.

EXAMPLES

Hereinafter, specific examples are described in more details with reference to Reference Examples and Examples. The present invention is not limited to the following specific examples.

Example 1

Purification of Gas Containing High Concentration Impurities

In Example 1, the gas containing high concentration impurities was purified using the carbon membrane module illustrated in FIG. 1. The details of the carbon membrane module were as follows: the outer diameter of the hollow fiber-shaped carbon membrane tube: 0.525 mm, the length of the hollow fiber-shaped carbon membrane tube: 85 mm, the number of the hollow fiber-shaped carbon membrane tube: 13, and the total surface area of the hollow fiber-shaped carbon membrane tube: 18.22 $cm^2$. The organic polymer membrane was formed by using the polyimide (aromatic polyimide) as a raw material, and then carbonized, to thereby produce the hollow fiber-shaped carbon membrane tube.

The carbon membrane module was maintained at 25° C., and the pressure of the supplied gas was set at 0.5 MPaG by providing the back-pressure regulator at the unpermeated gas discharge port.

(a) The gas, which was obtained by mixing ammonia of 500 sccm with hydrogen of 500 sccm as an impurity, was supplied into the carbon membrane module, and the volume concentration of the hydrogen, which was the impurity in the permeated gas, was measured.

(b) The gas, which was obtained by mixing ammonia of 500 sccm with helium of 500 sccm as an impurity, was supplied into the carbon membrane module, and the volume concentration of the helium, which was the impurity in the permeated gas, was measured.
(c) The gas, which was obtained by mixing ammonia of 500 sccm with methane of 500 sccm, was supplied into the carbon membrane module, and the volume concentration of the methane, which was the impurity in the permeated gas, was measured.

The volume concentration measurement was performed by using the gas chromatography equipped with a thermal conductivity detector (GC-TCD). The measurement results are shown in Table 1.

TABLE 1

| | Supplied gas | | Permeated gas | |
|---|---|---|---|---|
| Impurity gas component | Flow rate (sccm) | Volume concentration (ppm) | Flow rate (sccm) | Volume concentration (ppm) |
| (a) Hydrogen | 1,000 | 500,000 | 17 | 9990 |
| (b) Helium | 1,000 | 500,000 | 18.06 | 3300 |
| (c) Methane | 1,000 | 500,000 | 17 | 812 |

From Table 1, it was found that the flow rates of the permeated gases were within a range of about 17-18 sccm in the respective cases (a) to (c). Also, it was found that the volume concentrations of the impure gases could be reduced by 1/50 for hydrogen, 1/152 for helium, and 1/616 for methane.

Example 2

Purification of Gas Containing Low Concentration Impurities

In Example 2, the gas containing low concentration impurities was purified using the carbon membrane module illustrated in FIG. 1. The details of the carbon membrane module were as follows: the outer diameter of the hollow fiber-shaped carbon membrane tube: 0.39 mm, the length of the hollow fiber-shaped carbon membrane tube: 117 mm, the number of the hollow fiber-shaped carbon membrane tube: 38, and the total surface area of the hollow fiber-shaped carbon membrane tube: 54.9 cm$^2$. The organic polymer membrane was formed by using the polyphenylene oxide (PPO) as a raw material, heated, and then carbonized, to thereby produce the hollow fiber-shaped carbon membrane tube.

The carbon membrane module was maintained at 70° C., and the pressure of the supplied gas was set at 0.45 MPaG by providing the back-pressure regulator at the unpermeated gas discharge port.
(a) The gas, which was obtained by mixing ammonia of 450 sccm with hydrogen (14,390 ppb)/helium of 50 sccm as impurities, was supplied into the carbon membrane module, and the composition of the permeated gas was measured.
(b) The gas, which was obtained by mixing ammonia of 450 sccm with nitrogen (12,150 ppb)/helium of 50 sccm as impurities, was supplied into the carbon membrane module, and the composition of the permeated gas was measured.
(c) The gas, which was obtained by mixing ammonia of 450 sccm with carbon dioxide (9,960 ppb)/helium of 50 sccm as impurities, was supplied into the carbon membrane module, and the composition of the permeated gas was measured.
(d) The gas, which was obtained by mixing ammonia of 450 sccm with methane (12,230 ppb)/helium of 50 sccm as impurities, was supplied into the carbon membrane module, and the composition of the permeated gas was measured.

The volume concentration measurement was performed by using the gas chromatography equipped a pulse discharge detector (GC-PDD). The measurement results are shown in Table 2.

TABLE 2

| | Supplied gas | | Permeated gas | |
|---|---|---|---|---|
| Impurity gas component | Flow rate (sccm) | Volume concentration (ppb) | Flow rate (sccm) | Volume concentration (ppb) |
| (a) Hydrogen | 500 | 1,439 | 162 | 211 |
| (b) Nitrogen | 500 | 1,215 | 183 | <3 |
| (c) Carbon dioxide | 500 | 996 | 182 | 114 |
| (c) Methane | 500 | 1,223 | 175 | <6 |

From Table 2, it was found that the flow rates of the permeated gases were within a range of about 160-180 sccm in the respective cases (a) to (d). Also, it was found that the volume concentrations of the impure gases could be reduced by 1/7 for hydrogen, 1/405 or less for nitrogen, 1/9 for carbon dioxide, and 1/204 or less for methane.

Example 3

Purification of Gas Containing Low Concentration Impurities

In Example 3, the gas containing low concentration impurities was purified using the carbon membrane module illustrated in FIG. 1. The details of the carbon membrane module were as follows: the outer diameter of the hollow fiber-shaped carbon membrane tube: 0.20 mm, the length of the hollow fiber-shaped carbon membrane tube: 120 mm, the number of the hollow fiber-shaped carbon membrane tube: 100, and the total surface area of the hollow fiber-shaped carbon membrane tube: 76.9 cm$^2$. The organic polymer membrane was formed by using the polyphenylene oxide (PPO) as a raw material, heated, and then carbonized, to thereby produce the hollow fiber-shaped carbon membrane tube.

The carbon membrane module was maintained at 30° C., and the pressure of the supplied gas was set at 0.45 MPaG by providing the back-pressure regulator at the unpermeated gas discharge port.

The gas, which was obtained by mixing ammonia of 1,800 sccm with hydrogen (9,550 ppb), nitrogen (9,700 ppb), methane (9,200 ppb), and carbon monoxide (9,380 ppb)/helium of 200 sccm as impurities, was supplied into the carbon membrane module, and the composition of the permeated gas was measured.

The volume concentration measurement was performed by using the gas chromatography equipped a pulse discharge detector (GC-PDD). The measurement results are shown in Table 3.

TABLE 3

|     | Impurity gas component | Supplied gas | | Permeated gas | |
|-----|---|---|---|---|---|
|     |   | Flow rate (sccm) | Volume concentration (ppb) | Flow rate (sccm) | Volume concentration (ppb) |
| (a) | Hydrogen | 2,000 | 955 | 450 | 22 |
| (b) | Nitrogen |  | 970 |  | <3 |
| (c) | Methane |  | 920 |  | <6 |
| (c) | Carbon monoxide |  | 938 |  | 2.5 |

From Table 3, it was found that the flow rate of the permeated gas was about 450 sccm. Also, it was found that the volume concentrations of the impure gases could be reduced by 1/43 for hydrogen, 1/323 or less for nitrogen, 1/153 or less for methane, and 1/375 for carbon monoxide.

Comparative Example 1

Purification of Gas Containing Low Concentration Impurities Using Organic Polymer Membrane In Comparative example 1, the gas containing low concentration impurities was purified using the organic polymer membrane module. This organic polymer membrane module had the same configuration as the carbon membrane module illustrated in FIG. 1 except that the organic polymer membrane was used instead of the carbon membrane. The details of the organic polymer membrane module were as follows: the outer diameter of the hollow fiber-shaped organic polymer membrane tube: 0.41 mm, the length of the hollow fiber-shaped organic polymer membrane tube: 138 mm, the number of the hollow fiber-shaped organic polymer membrane tube: 10, and the total surface area of the hollow fiber-shaped organic polymer membrane tube: 17.5 cm$^2$. The hollow fiber-shaped organic polymer membrane was produced by using polyimide (aromatic polyimide) as a raw material.

The organic polymer membrane module was maintained at 30° C., and the pressure of the supplied gas was set at 0.45 MPaG by providing the back-pressure regulator at the unpermeated gas discharge port.

Ammonia was supplied into the organic polymer membrane module for several hours before the gas obtained by mixing ammonia with impurities was supplied. Consequently, the hollow fiber-shaped organic polymer membrane module was embrittled, and the hollow fiber shape could not be maintained. It was considered that this embrittlement was because the ammonia deteriorated the polyimide which was the raw material of the hollow fiber-shaped organic polymer membrane. However, as described in Example 1, the hollow fiber-shaped carbon membrane, which was obtained by carbonizing the hollow fiber-shaped organic polymer membrane, was not deteriorated by the reactive gas such as ammonia.

Comparative Example 2

Purification of Gas Containing Low Concentration Impurities Using Organic Polymer Membrane In Comparative example 2, the gas containing low concentration impurities was purified using the organic polymer membrane module. This organic polymer membrane module had the same configuration as the carbon membrane module illustrated in FIG. 1 except that the organic polymer membrane was used instead of the carbon membrane. The details of the organic polymer membrane module were as follows: the outer diameter of the hollow fiber-shaped organic polymer membrane tube: 0.20 mm, the length of the hollow fiber-shaped organic polymer membrane tube: 138 mm, the number of the hollow fiber-shaped organic polymer membrane tube: 30, and the total surface area of the hollow fiber-shaped organic polymer membrane tube: 26.0 cm$^2$. The hollow fiber-shaped organic polymer membrane was produced by using silicone as a raw material.

The organic polymer membrane module was maintained at 30° C., and the pressure of the supplied gas was set at 0.45 MPaG by providing the back-pressure regulator at the unpermeated gas discharge port.

The gas, which was obtained by mixing ammonia of 1,800 sccm with hydrogen (9,620 ppb), nitrogen (9,820 ppb), methane (9,770 ppb), and carbon monoxide (9,470 ppb)/helium of 200 sccm as impurities, was supplied into the organic polymer membrane module, and the composition of the permeated gas was measured.

The volume concentration measurement was performed by using the gas chromatography equipped a pulse discharge detector (GC-PDD). The measurement results are shown in Table 4.

TABLE 4

|     | Impurity gas component | Supplied gas | | Permeated gas | |
|-----|---|---|---|---|---|
|     |   | Flow rate (sccm) | Volume concentration (ppb) | Flow rate (sccm) | Volume concentration (ppb) |
| (a) | Hydrogen | 2,000 | 962 | 14 | 365 |
| (b) | Nitrogen |  | 982 |  | 202 |
| (c) | Methane |  | 977 |  | 469 |
| (c) | Carbon monoxide |  | 947 |  | 240 |

From Table 4, it was found that the flow rate of the permeated gas was about 14 sccm. Also, it was found that the volume concentrations of the impure gases could be reduced by 1/3 for hydrogen, 1/5 for nitrogen, 1/2 for methane, and 1/4 for carbon monoxide. As compared with the result of the carbon membrane, both of the flow rate of the permeated gas and the purification performance were inferior. A so-called silicone rubber membrane, which is obtained by using silicone as a raw material, is a conventional organic polymer membrane having a solution diffusion action. However, this silicon rubber membrane is inferior in separation performance to the carbon membrane having the molecular sieving action, and therefore is not suitable in the use of the present invention in this respect.

Industrial Applicability

The present invention can be used for a recovery unit that recoveries a used gas to reuse it as an ultrapure semiconductor material gas, and a unit or equipment that produces or charges an ultrapure semiconductor material gas.

The invention claimed is:

1. A gas purification method comprising: a step of allowing at least one gas selected from the group consisting of a hydride gas, a hydrogen halide gas, and a halogen gas, each gas containing an impurity at 10 ppm or less, to permeate a carbon membrane having a molecular sieving action which membrane is produced by sintering an organic polymer membrane.

2. A gas purification method according to claim 1, wherein the carbon membrane is in a hollow fiber shape or a pipe shape.

* * * * *

UNITED STATES PATENT AND TRADEMARK OFFICE
CERTIFICATE OF CORRECTION

| | | |
|---|---|---|
| PATENT NO. | : 8,357,228 B2 | Page 1 of 1 |
| APPLICATION NO. | : 12/682329 | |
| DATED | : January 22, 2013 | |
| INVENTOR(S) | : Miyazawa et al. | |

It is certified that error appears in the above-identified patent and that said Letters Patent is hereby corrected as shown below:

On the Title Page

Item (73) Assignees should read: Taiyo Nippon Sanso Corporation

Tokyo (JP)

National Institute of Advanced Industrial Science and Technology

Tokyo (JP)

Signed and Sealed this
Fifth Day of March, 2013

Teresa Stanek Rea
*Acting Director of the United States Patent and Trademark Office*